US008173005B2

(12) United States Patent
Naterer et al.

(10) Patent No.: US 8,173,005 B2
(45) Date of Patent: May 8, 2012

(54) UPGRADING WASTE HEAT WITH HEAT PUMPS FOR THERMOCHEMICAL HYDROGEN PRODUCTION (75) Inventors: Greg F. Naterer, Whitby (CA); Richard Marceau, Oshawa (CA)

(73) Assignee: University of Ontario Institute of Technology, Ontario (CA)

( * ) Notice: Subject to any disclaimer, the term of this patent is extended or adjusted under 35 U.S.C. 154(b) by 934 days.

(21) Appl. No.: 12/184,423

(22) Filed: Aug. 1, 2008

(65) Prior Publication Data

US 2010/0025260 A1    Feb. 4, 2010

(51) Int. Cl.
*C01B 3/02* (2006.01)
*C25B 1/02* (2006.01)

(52) U.S. Cl. ............... 205/637; 205/633; 423/648.1; 423/579

(58) Field of Classification Search .............. None
See application file for complete search history.

(56) References Cited

U.S. PATENT DOCUMENTS

| | | | | |
|---|---|---|---|---|
| 4,532,778 A | * | 8/1985 | Clark et al. ............ | 62/477 |
| 2005/0232833 A1 | * | 10/2005 | Hardy et al. ............ | 422/188 |
| 2008/0283390 A1 | * | 11/2008 | Fan et al. ............... | 204/242 |

OTHER PUBLICATIONS

M. Granovskii et al., Thermodynamic analysis of the use a chemical heat pump to link a supercritical water-cooled nuclear reactor and a thermochemcial water-splitting cycle for hydrogen production, Mar. 4, 2008, J. of Power and Energy Systems, pp. 756-767.*

B. Yildiz and M.S. Kazimi, Efficiency of hydrogen production systems using alternative nuclear energy technologies, 2006, International Journal of Hydrogen Energy, vol. 31, pp. 77-92.*

I. Dincer, "Technical, environmental and exergetic aspects of hydrogen energy systems", International Journal of Hydrogen Energy, 27: 265-285 (2002).

M. A. Rosen, "Thermodynamic Investigation of Hydrogen Production by Steam-Methane Reforming", Int. J. Hydrogen Energy, 16(3): 207-217 (1991).

B. Yildiz et al., "Efficiency of hydrogen production systems using alternative nuclear energy technologies", International Journal of Hydrogen Energy, 31: 77-92 (2006).

M. A. Rosen et al., "Exergy Analysis of Hydrogen Production from Heat and Water by Electrolysis", Int. J. Hydrogen Energy, 17(3): 199-204 (1992).

C. Forsberg, "Hydrogen, nuclear energy, and the advanced high-temperature reactor", Int. J. Hydrogen Energy, 28: 1073-1081 (2003).

M. A. Lewis et al., "Hydrogen Production at <550° C. Using a Low Temperature Thermochemical Cycle", ANS/ENS Exposition, New Orleans, Nov. 2003.

(Continued)

*Primary Examiner* — In Suk Bullock
*Assistant Examiner* — Timothy G Kingan
(74) *Attorney, Agent, or Firm* — Patrick J. Hagan; Dann, Dorfman, Herrell and Skillman, P.C.

(57) ABSTRACT

This invention relates to hydrogen production using combined heat pumps and a thermochemical cycle. Low grade waste heat can be upgraded to higher temperatures via salt/ammonia and/or MgO/vapor chemical heat pumps, which release heat at successively higher temperatures through exothermic reactions, or vapor compression heat pumps that upgrade thermal energy with phase change fluids. Using this new approach, low grade heat or waste heat from nuclear or other industrial sources can be transformed to a useful energy supply for thermochemical hydrogen production.

8 Claims, 6 Drawing Sheets

OTHER PUBLICATIONS

M. A. Lewis et al., "High Temperature Thermochemical Processes", 2006 Annual Progress Report of the DOE Hydrogen Program, pp. 182-185, US Department of Energy, Washington DC (2006).

M. Yamawaki et al., "Application of nuclear energy for environmentally friendly hydrogen generation", Int. J. Hydrogen Energy, 32: 2719-2725 (2007).

A. I. Miller et al., "A Review of Canadian Advances in Thermochemical Hydrogen Production within the Context of Conventional Hydrogen Production", Paper CN-152, IAEA Conference, pp. 1-7, Ibaraki, Japan, Apr. 2007.

W. Wongsuwan et al., "A review of chemical heat pump technology and applications", Applied Thermal Engineering, 21: 1489-1519 (2001).

Y. Kato et al, "Kinetic Study of the Hydration of Magnesium Oxide for a Chemical Heat Pump", Applied Thermal Engineering, 16(11): 853-862 (1996).

V. E. Sharonov et al., "Chemical and adsorption heat pumps: Comments no the second law efficiency", Chemical Engineering Journal, 136: 419-424 (2008).

Y. Kato et al., "Thermal analysis of a magnesium oxide/water chemical heat pump for cogeneration", Applied Thermal Engineering, 21: 1067-1081 (2001).

S. Spoelstra et al., "Techno-economic feasibility of high-temperature high-lift chemical heat pumps for upgrading industrial waste heat", Applied Thermal Engineering, 22: 1619-1630 (2002).

* cited by examiner

UPGRADING WASTE HEAT WITH HEAT PUMPS FOR THERMOCHEMICAL HYDROGEN PRODUCTION

FIELD OF THE INVENTION

This invention relates to hydrogen production using combined chemical or vapour compression heat pumps and a thermochemical cycle. Low grade waste heat can be upgraded to higher temperatures via salt/ammonia and/or MgO/vapour chemical heat pumps, which release heat at successively higher temperatures through exothermic reactions, or vapour compression heat pumps that upgrade thermal energy with phase change fluids. Using this new approach, low grade heat or waste heat from nuclear or other industrial sources can be transformed to a useful energy supply at higher temperatures for thermochemical hydrogen production.

BACKGROUND OF THE INVENTION

Hydrogen is widely believed to be a major solution to greenhouse gas mitigation and sustainable development of the world economy. Industry already consumes about 600 billion cubic meters of hydrogen per year in various applications, which corresponds to a worldwide hydrogen market of several hundreds of billions of dollars. In addition to automakers that are investing significantly in hydrogen vehicle development, hydrogen demand from other industries like the chemical, fertilizer and petrochemical industries is rising rapidly. In Alberta, Canada, oil sands development is requiring large quantities of hydrogen to upgrade bitumen to synthetic crude. Dincer I. *Technical, environmental and exergetic aspects of hydrogen energy systems. International Journal of Hydrogen Energy* 2002; 27(3):265-285 has outlined many of the key technical and environmental concerns of hydrogen production. Unlike SMR (steam-methane reforming) technology (Rosen M A. *Thermodynamic investigation of hydrogen production by steam-methane reforming. International Journal of Hydrogen Energy* 1992; 16(3): 207-217), nuclear-based hydrogen production does not emit greenhouse gases. The rise in oil and natural gas prices and the need to sequester $CO_2$ has tilted the economic balance away from the traditional SMR technology. A comprehensive overview of various hydrogen production schemes has been presented by Yildiz and Kazimi (Yildiz B, Kazimi M S. *Efficiency of hydrogen production systems using alternative energy technologies. International Journal of Hydrogen Energy* 2006; 31:77-92). Rosen M A, Scott D S. *Exergy analysis of hydrogen production from heat and water by electrolysis. International Journal of Hydrogen Energy* 1992; 17(3): 199-204 evaluated the thermodynamic efficiency of electrolytic hydrogen production from nuclear energy and other sources.

Electrolysis is a proven, commercial technology that separates water into hydrogen and oxygen using electricity. Net electrolysis efficiencies (including the heat-to-electricity efficiency for thermal power plants) are typically about 24%. In contrast, thermochemical cycles to produce hydrogen using nuclear heat can achieve heat-to-hydrogen efficiencies up to 50% or higher. Thermochemical "water splitting" requires an intermediate heat exchanger between the nuclear reactor and hydrogen plant, which transfers heat from the reactor coolant to the thermochemical cycle (Forsberg C W. *Hydrogen, nuclear energy and advanced high-temperature reactor. International Journal of Hydrogen Energy* 2003; 28:1073-1081). An intermediate loop prevents exposure to radiation from the reactor coolant in the hydrogen plant, as well as corrosive fluids in the thermochemical cycle entering the nuclear plant.

A technical challenge of thermochemical hydrogen production is to provide high temperatures typically above 800° C., which are currently unavailable from nuclear reactors. A recent study (Granovskii M, Dincer I, Rosen M, Pioro I. 2008. *Thermodynamic analysis of the use of a chemical heat pump to link a supercritical water-cooled nuclear reactor and a thermochemical water-splitting cycle for hydrogen production, JSME Journal of Power and Energy Systems,* 2008; 2: 756-767) has linked the concepts of chemical heat pumps to nuclear-based hydrogen production for this purpose of raising the temperatures. However, this invention differs with the recent study in several regards. It shows specifically how and where heat pumps can be integrated into the thermochemical cycle. The past study involves a different system with methane, much higher temperatures (600° C., not waste heat at 80° C.) relevant to different thermochemical cycles and next-generation nuclear reactors (excluding upgrades of waste heat from near-term nuclear reactors), inclusion of vapour compression as well as other chemical heat pumps, sequential stages of heat pumps and other differences.

SUMMARY OF THE INVENTION

In broad terms, the process described herein relates to a process for obtaining hydrogen from water decomposition using a thermochemical cycle, in combination with at least one heat pump, wherein low grade heat is upgraded to a higher temperature either by exothermic reactions or phase change of a working fluid. The low grade heat is obtained from an external source or from exothermic steps in the thermochemical cycle. It is then subsequently upgraded to a higher temperature and then fed to endothermic steps in the thermochemical cycle.

More particularly, the process obtains hydrogen from water decomposition using a thermochemical cycle, in combination with at least one heat pump. Low grade heat is upgraded to a higher temperature either by exothermic reactions or phase change of a working fluid, and the low grade heat is obtained from an external source or from exothermic steps in the thermochemical cycle. It is then upgraded to a higher temperature and then fed to endothermic steps in the thermochemical cycle. In particular, a copper-chlorine (Cu—Cl) thermochemical cycle process for producing hydrogen comprises the steps of: 1) reacting electrolytic Cu and dry HCl to obtain hydrogen gas and molten CuCl salt; 2) subjecting solid CuCl and HCl in an aqueous solution to electrolysis to obtain Cu and an aqueous slurry containing HCl and $CuCl_2$; 3) drying the aqueous slurry obtained from step (2) to produce solid $CuCl_2$ and $H_2O/HCl$ vapour; 4) reacting the solid $CuCl_2$ with steam to obtain solid $CuOCuCl_2$ and gaseous HCl; and 5) decomposing the solid $CuOCuCl_2$ obtained in step 4 at a temperature of about 500° C. to obtain molten CuCl and oxygen gas.

Various processes of integrating the upgraded heat with a thermochemical cycle may be utilized. For example, the heat from the exothermic step 1 of the hydrogen production process is transferred to the heat pump, which upgrades the heat to a higher temperature, whereupon it is supplied to the endothermic step 5 of the hydrogen production process. Also, heat recovered from the molten CuCl that exits step 5 is upgraded by a heat pump to supply thermal energy to the hydrolysis step 4, or else heat recycled back up to step 5. Similarly, heat recovered from hydrogen or CuCl that exits step 1, or oxygen that exits step 5, is upgraded via the heat pump to supply thermal energy to the endothermic reactors in steps 4 or 5.

The heat pump may be selected from chemical heat pumps and/or vapour compression heat pumps. Combinations of such pumps may be used in the thermochemical cycle.

DETAILED DESCRIPTION OF THE INVENTION

Heat upgrading for a copper-chlorine (Cu—Cl) cycle is exemplified herein. This particular cycle has been identified by Atomic Energy of Canada Ltd. (AECL) at its Chalk River Laboratories (CRL) and the Argonne National Laboratory (ANL) as a promising cycle for thermochemical hydrogen production (Lewis M A, Miller, A. *Lower temperature thermochemical hydrogen production, US Department of Energy, International Nuclear Energy Research Initiative*, June 2004). Other cycles may also be employed. In the Cu—Cl cycle, water is decomposed into hydrogen and oxygen through intermediate Cu—Cl compounds. Past studies at AECL and the Argonne National Laboratory (ANL) have developed enabling technologies for the Cu—Cl thermochemical cycle, through an International Nuclear Energy Research Initiative (I-NERI), as reported by Lewis et al. (Lewis M A, Serban M, Basco J K. *Hydrogen production at <550° C. using a low temperature thermochemical cycle. ANS/ENS Exposition*, New Orleans, November 2003). The Cu—Cl cycle is well matched to Canada's nuclear reactors, since its heat requirement for high temperatures is adaptable to the Super-Critical Water Reactor (SCWR), which is being developed as Canada's Generation IV nuclear reactor. Other advantages of the present process are reduced demands on materials of construction, relatively inexpensive chemical agents, insignificant solids handling, reactions going to completion without side reactions and the ability to utilize low grade waste heat for energy intensive drying and other processes, particularly with heat upgrading by heat pumps.

Other countries (Japan, U.S., France and others) are currently advancing nuclear technology for thermochemical cycles of hydrogen production. These include the sulphur-iodine (S—I), copper-chlorine (Cu—Cl), cerium-chlorine (Ce—Cl), iron-chlorine (Fe—Cl), magnesium-iodine (Mg.I), vanadium-chlorine (V—Cl), copper-sulfate (Cu—SO$_4$) and hybrid chlorine cycles (Lewis, M A, Taylor, A, *High temperature thermochemical processes*, 2006 *Annual Progress Report of the DOE Hydrogen Program*, US Department of Energy, Washington, D.C., 2006). Although this invention focuses on heat upgrading within the Cu—Cl cycle, the underlying principles of operating heat pumps to raise temperatures from exothermic reactors, heat exchangers and/or waste heat sources to supply higher temperature endothermic reactors can be readily applied to additional thermochemical cycles above and other cycles of thermochemical water splitting that were not listed here. The Sandia National Laboratory in the U.S. and CEA in France are developing a hydrogen pilot plant with a sulfur-iodine (S—I) cycle. The Korean KAERI Institute is collaborating with China to produce hydrogen with their HTR-10 reactor. The Japan Atomic Energy Agency (JAEA) aims to complete a large S—I plant to produce 60,000 m$^3$/hr of hydrogen by 2020, which can supply about 1 million fuel cell vehicles (Yamawakia M, Nishiharab T, Inagakib Y, Minatoc K, Oigawac H, Onukib K, Hinob R, Ogawab M *Application of nuclear energy for environmentally friendly hydrogen generation. International Journal of Hydrogen Energy*, 2007: 32: 2719-2725). Ten countries around the world are working together in the Generation IV International Forum (GIF) to lay the groundwork for the fourth generation nuclear reactor. They are developing the technologies for co-generation of electricity and hydrogen by high-temperature thermochemical cycles (or electrolysis), through multilateral collaborations.

BRIEF DESCRIPTION OF THE DRAWINGS

FIG. 2(*a*) is a schematic diagram and FIG. 2(*b*) is an equilibrium diagram of a salt/ammonia chemical heat pump;

FIG. 3(*a*) is a schematic diagram and FIG. 3(*b*) is an equilibrium diagram of an MgO/vapour chemical heat pump;

FIG. 6(*a*) is a sensitivity plot of the cooling COP vs. T$_e$ (T$_g$=293K, T$_c$=641K); and FIG. 6(*b*) is a sensitivity plot of the cooling COP vs. T$_c$ (T$_g$=293K, T$_e$=420K).

COPPER-CHLORINE (Cu—Cl) CYCLE

The Cu—Cl thermochemical cycle uses a series of reactions to achieve the overall splitting of water into hydrogen and oxygen:

$$H_2O(g) \rightarrow H_2 + \tfrac{1}{2}O_2$$

Figure 1:
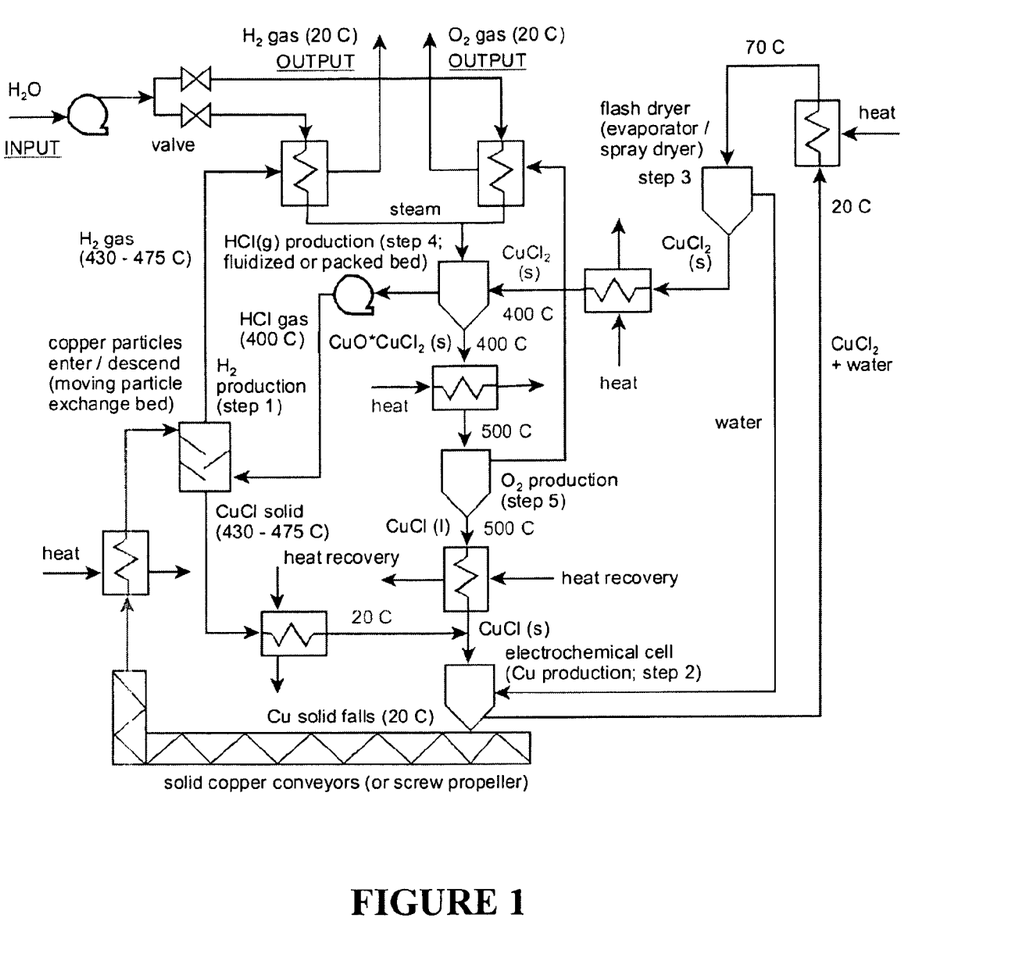
FIG. 1 is a schematic layout of a Cu—Cl cycle for production of hydrogen gas from the thermochemical decomposition of water.

The Cu—Cl cycle is illustrated schematically in FIG. 1. Table 1 sets out the reactions, conditions, feed materials and outputs for various steps of the cycle.

The primary components of the cycle are four interconnected reaction vessels, with intermediate heat exchangers (see schematic). Step 1 in the Cu—Cl cycle is a hydrogen gas production step, which occurs at 430-475° C. It is characterized by the reaction $$2Cu(s) + 2HCl(g) \rightarrow H_2(g) + 2CuCl(l)$$

Solid copper particles enter the reactor and mix with HCl (gas) to generate H$_2$ (gas) and molten CuCl (liquid) at the exit. The reaction process involves three phases and turbulent gas mixing.

TABLE 1

Steps in the Cu—Cl Thermochemical Cycle for Hydrogen Production

| Equation | Reaction | Temperature Range (° C.) | | Feed/Output* |
|---|---|---|---|---|
| 1 | 2Cu(s) + 2HCl(g) → 2CuCl(l) + H$_2$(g) | 430-475 | Feed: | Electrolytic Cu + dry HCl |
| | | | Output: | H$_2$ + CuCl(l) salt + Q |
| 2 | 2CuCl(s) → 2CuCl (aq) → CuCl$_2$(aq) + Cu(s) | Ambient (electrolysis) | Feed: | Powder/granular CuCl and HCl + V |
| | | | Output: | Electrolytic Cu and slurry containing HCl and CuCl$_2$ |

TABLE 1-continued

Steps in the Cu—Cl Thermochemical Cycle for Hydrogen Production

| Equation | Reaction | Temperature Range (° C.) | Feed/Output* | |
|---|---|---|---|---|
| 3 | $CuCl_2(aq) \to CuCl_2(s)$ | 70-180 | Feed: | Slurry containing HCl and $CuCl_2$ + Q |
| | | | Output: | Powder/granular $CuCl_2$ + $H_2O$/HCl vapours |
| 4 | $2CuCl_2(s) + H_2O(g) \to CuOCuCl_2(s) + 2HCl(g)$ | 400 | Feed: | Powder/granular $CuCl_2$ + $H_2O(g)$ + Q |
| | | | Output: | Powder/granular $CuOCuCl_2$ + 2HCl(g) |
| 5 | $CuOCuCl_2(s) \to 2CuCl(l) + 1/2O_2(g)$ | 500 | Feed: | Powder/granular $CuOCuCl_2(s)$ + Q |
| | | | Output: | Molten CuCl salt + oxygen |

*Q denotes thermal energy, and V denotes electrical energy

Step 2 of the Cu—Cl cycle can be implemented by means of an electrochemical cell, which produces solid copper particles via the reaction:

$$2CuCl(s) \to CuCl_2(aq) + Cu(s)$$

CuCl(aq) enters the unit, then copper particles are formed on the electrodes and removed (called a copper electrowinning process). Important parameters include the chemical kinetics in the electrochemical cell, as a function of temperature, pressure and compositions. Incoming solid CuCl streams from Steps 1 and 5 pass through heat exchangers and mix with liquid HCl before entering the electrochemical cell under ambient conditions.

In the electrochemical step, an aqueous CuCl solution reacts in an electrochemical cell to produce solid copper and aqueous $CuCl_2$. Solid particles extracted from the cell are collected and transported by a copper conveyer or screw propeller to the hydrogen production chamber. AECL (Miller, A I, Duffey, R B, Suppiah, S. *A review of Canadian advances in thermochemical hydrogen production within the context of conventional hydrogen production*, Paper CN-152, *IAEA Conference*, Ibaraki, Japan, April, 2007) is investigating modifications of the Cu—Cl cycle, in order to reduce the challenges involved in solid handling by direct electrolysis of CuCl(aq) and HCl(aq) to produce hydrogen, as per the following reaction:

$$2CuCl(aq) + 2HCl(aq) \to H_2(g) + 2CuCl_2(aq)$$

The above reaction is proposed to replace steps 1 and 2 of the Cu—Cl cycle.

In Step 3 of the Cu—Cl cycle (drying process), water is removed from the aqueous $CuCl_2$ stream that exits from the electrochemical cell by drying, to produce solid $CuCl_2(s)$, which is required for Step 4. This process can be accomplished by a spray dryer or other mechanical separation of water from aqueous $CuCl_2$.

Step 4 in the cycle produces HCl(g) at about 430° C. in a fluidized bed reactor, via the following hydrolysis reaction:

$$2CuCl_2(s) + H_2O(g) \to CuOCuCl_2(s) + 2HCl(g)$$

In this step, high temperature steam and solid $CuCl_2$ particles mix to produce the two exit streams. Steam enters a bed of $CuCl_2(s)$ particles supplied from Step 3 (flash dryer). HCl (g) and $CuOCuCl_2$ solid particles leave the reactor. The HCl (g) supplies the hydrogen production step (Step 1), while the exiting particles supply the oxygen reactor (Step 5), which implements the following reaction:

$$CuOCuCl_2(s) \to 2CuCl(l) + 1/2O_2(g).$$

Heat exchangers represent an important component within the Cu—Cl cycle. Between each step of the Cu—Cl plant, heat exchangers are needed for heat input or heat recovery and fluid transport to different portions of the thermochemical cycle. The oxygen production step has the highest temperature requirement (about 500° C.) in the cycle. Since temperature drops are experienced across each heat exchanger, the inflow stream to the oxygen reactor unit must exceed 500° C. Multiple heat exchangers are needed between the heat source and the oxygen reactor (Step 5), through an intermediate loop. Heat supply is required at various temperatures throughout the cycle, so an effective series arrangement of heat exchangers to minimize heat losses is critical. In particular, an intermediate loop with several heat exchangers in series is needed to give progressively higher temperatures. Several other types of fluid devices are used throughout the Cu—Cl cycle, including the electrochemical cell, pumps, valves, pipes, blowers (for gases), solid separators and so forth. Energy analysis can be used to predict efficiencies and thermodynamic losses in the overall system and individual steps. Alternatively, entropy production is another valuable parameter for identifying locations and magnitudes of efficiency losses.

Current nuclear reactors cannot supply heat at sufficiently high temperatures for all steps of the Cu—Cl cycle. Also, a large portion of heat generated from thermal power plants (about two-thirds) is released into the environment as a by-product of electricity generation. This "waste heat" can be recovered to perform useful work when it is diverted to thermochemical production of hydrogen. This process transforms the waste heat by upgrading its temperature through heat pumps to supply heat at sufficient temperatures for endothermic reactors in the Cu—Cl cycle.

Vapour compression systems are commonly used for refrigeration, air conditioning and heat pumps, but these are normally limited to operating temperatures at or below ambient conditions. Another category of heat pump is a chemical heat pump (CHP), which has a unique ability to upgrade heat by several hundreds of degrees centigrade. CHPs are systems that use coupled exothermic and endothermic reactors to store thermal energy and transform it to another temperature, particularly by upgrading thermal energy at low temperatures up to higher temperatures. Through a sequence of chemical reactions that change the temperature level of the thermal energy, CHPs can be utilized for chemical storage of solar or renewable energy sources.

Various chemical substances have been used successfully in CHPs, such as systems containing water (hydroxide/oxide, zeolite/water), ammonia (salt/ammonia, amine complexes), sulfur dioxide (sulphite oxide, pyrosulphate/sulfate), hydrogen (hydrides, hydrogenation) and various others (Wongsuwan, W, Kumar, S, Neveu, P, Meunier, F. *A review of chemical heat pump technology and applications*, Applied Thermal Engineering, vol. 21, pp. 1489-1519, 2001). Chemical heat pumps are normally classified into two types: solid-gas and liquid-gas. Solid-gas CHPs consist of reactor(s) (or adsorbers), evaporator(s) and condenser(s). Liquid-gas systems have at least two reactors: endothermic and exothermic reactors. Other auxiliary equipment is also normally required in these systems, such as heat exchangers, separators and fluid handling equipment. The second law efficiency of CHPs has been analyzed previously (Sharonov, V E, Aristov, Y I. *Chemical and adsorption heat pumps: Comments on the second law efficiency, Chemical Engineering Journal*, vol. 136, pp. 419-424, 2008) to determine the coefficient of performance, COP, for various gas-solid systems. This description focuses on two specific solid-gas CHPs, namely salt/ammonia and MgO/water systems, particularly applications to waste heat upgrading for thermochemical hydrogen production.

The process disclosed herein involves upgrading of low-temperature waste heat to higher temperatures with chemical or vapour compression heat pumps to supply heat to thermochemical cycles of hydrogen production. In particular, the copper-chlorine (Cu—Cl) cycle requires temperatures up to 500° C. for the endothermic reaction of copper oxychloride decomposition. As described earlier, Table 1 and FIG. 1 illustrate the sequence of chemical reactions and conceptual layout of the Cu—Cl cycle, respectively. Waste heat from nuclear plants at 80° C. (such as the moderator vessel in CANDU reactors) can be utilized for low-temperature processes, such as spray drying of aqueous cupric chloride, but not higher temperature endothermic reactors. Using a combined sequence of salt/ammonia, MgO/vapour and/or vapour compression heat pumps, the waste heat can be upgraded to higher temperatures for those reactors.

A process of low-temperature heat recovery could generate electricity from the waste heat source to drive compressors and other auxiliary equipment for the heat pumps. In the subsequent passages, the following nomenclature is used: Q=heat transfer rate (W), S=entropy (W/K), T=temperature (K), W=work input (W), COP=coefficient of performance. The subscripts c, e, g, gen and r refer to Carnot, evaporation, gas, generation and reference, respectively. Also, the superscripts c, h and w refer to cooling, heating and work input, respectively.

Salt/Ammonia Chemical Heat Pump

Figure 2:
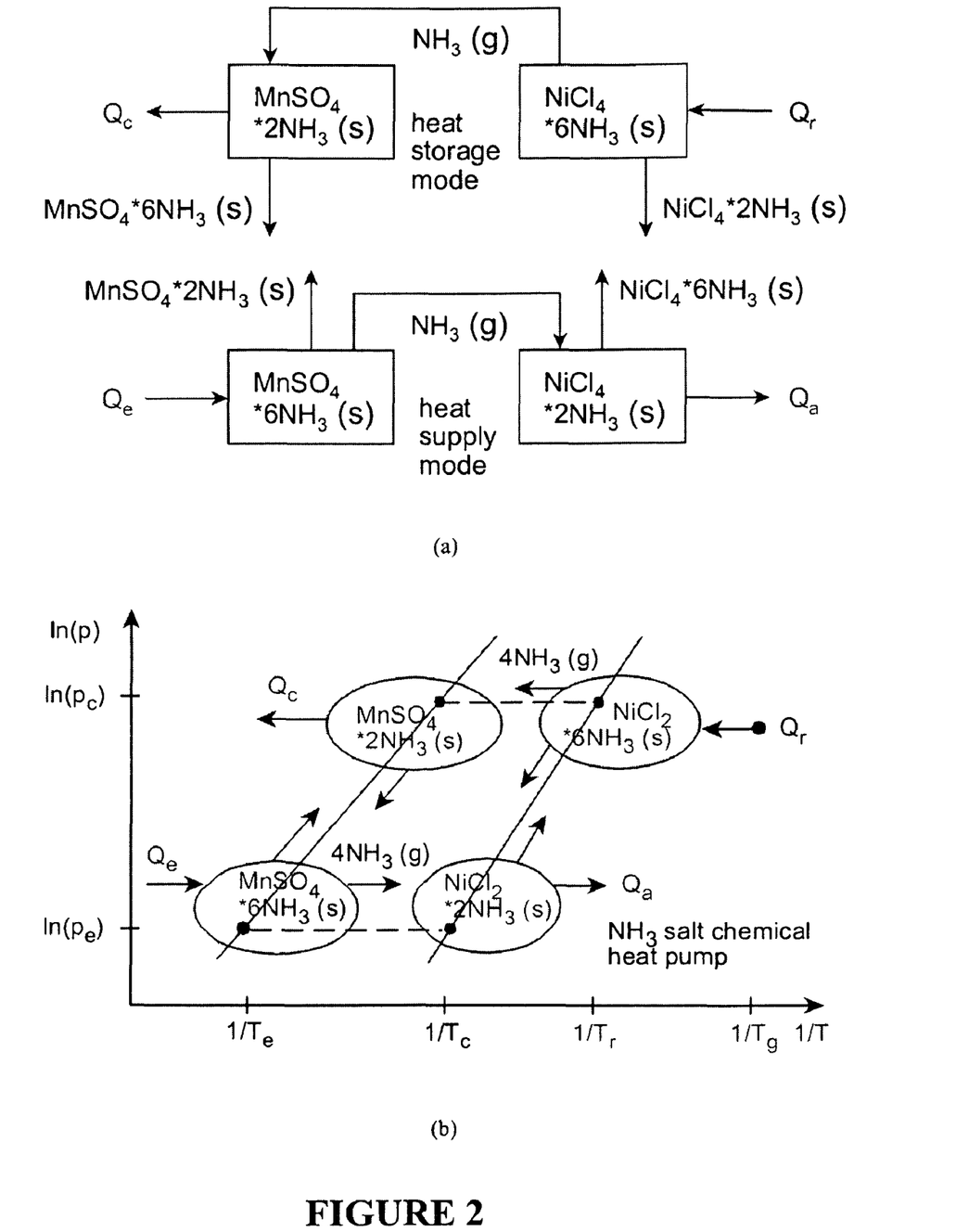

This chemical heat pump consists of salts that are able to absorb/desorb ammonia vapour at different operating temperatures. In FIG. 2, the ammonia vapour pressure is plotted as a function of temperature for two different salts, often called LTS (low temperature salt) and HTS (high temperature salt). The desorption reaction is endothermic. Heat must be supplied to the gas/solid reactor to release ammonia vapour from the LTS. When this ammonia vapour flows to the HTS, it is absorbed and heat is released in an exothermic reaction. The pair of salts is $MnSO_4/NH_3$ (LTS) and $NiCl_2/NH_3$ (HTS). The operation of the chemical heat pump is described below:

$$MnSO_4 \cdot 6NH_3 + Q_{waste} \leftrightarrow MnSO_4 \cdot 2NH_3 + 4NH_3;$$
$$\Delta H = +57.6 \text{ kJ/mol}(NH_3) \quad (1)$$

$$NiCl_2 \cdot 2NH_3 + 4NH_3 \leftrightarrow NiCl_2 \cdot 6NH_3 + Q_{out}; \Delta H = -55.3$$
$$\text{kJ/mol}(NH_3) \quad (2)$$

TABLE 2

Typical operating parameters of
salt/ammonia and MgO/vapour chemical heat pumps

|  | Salt/ammonia chemical heat pump | MgO/vapour chemical heat pump |
|---|---|---|
| $T_e$ ° C. | 80 | 259 |
| $T_c$ ° C. | 120 | 300 |

TABLE 2-continued

Typical operating parameters of
salt/ammonia and MgO/vapour chemical heat pumps

|  | Salt/ammonia chemical heat pump | MgO/vapour chemical heat pump |
|---|---|---|
| $T_r$ ° C. | 140 | 310 |
| $T_g$ ° C. | 259 | 510 |

Typical operating conditions of a salt/ammonia heat pump are listed in Table 2, above. An integrated closed cycle of a salt/ammonia chemical heat pump was presented and analyzed previously (Spoelstra, S, Haije, W G, Dijkstra, J W. *Techno-economic feasibility of high-temperature high-lift chemical heat pumps for upgrading industrial waste heat, Applied Thermal Engineering*, vol. 22, pp. 1619-1630, 2002). In their analysis, 5000 kW of low-temperature heat at 140° C. was upgraded to 2,051 kW of high-temperature heat at 240° C. Shell-and-tube heat exchangers were used with finned tubes to achieve this operating capacity. Each reactor vessel was about 6 m in height, with a diameter of 2-3 m. The total weight of one vessel was about 50 tonnes, including the salt and heat exchanger tubes. A very high coefficient of performance was reported (COP=97), since electrical power is only required to pump around liquid streams. The total capital investment for the 5 MW salt/ammonia chemical heat pump was about 1.27M euros (2002). This chemical heat pump could be used as a "bottoming cycle" to upgrade waste heat to an intermediate stage, before another CHP upgrades further to higher temperatures. The reaction kinetics become unfavorable if a single CHP attempts to operate over an excessively large temperature range, so sequential stages over different ranges are required.

Magnesium Oxide Chemical Heat Pump

A magnesium oxide/vapour chemical heat pump is described by the following chemical reaction:

$$MgO(s) + H_2O(g) \leftrightarrow MgO(OH)_2; \Delta H = -81.02 \text{ kJ/mol} \quad (3)$$

Figure 3:
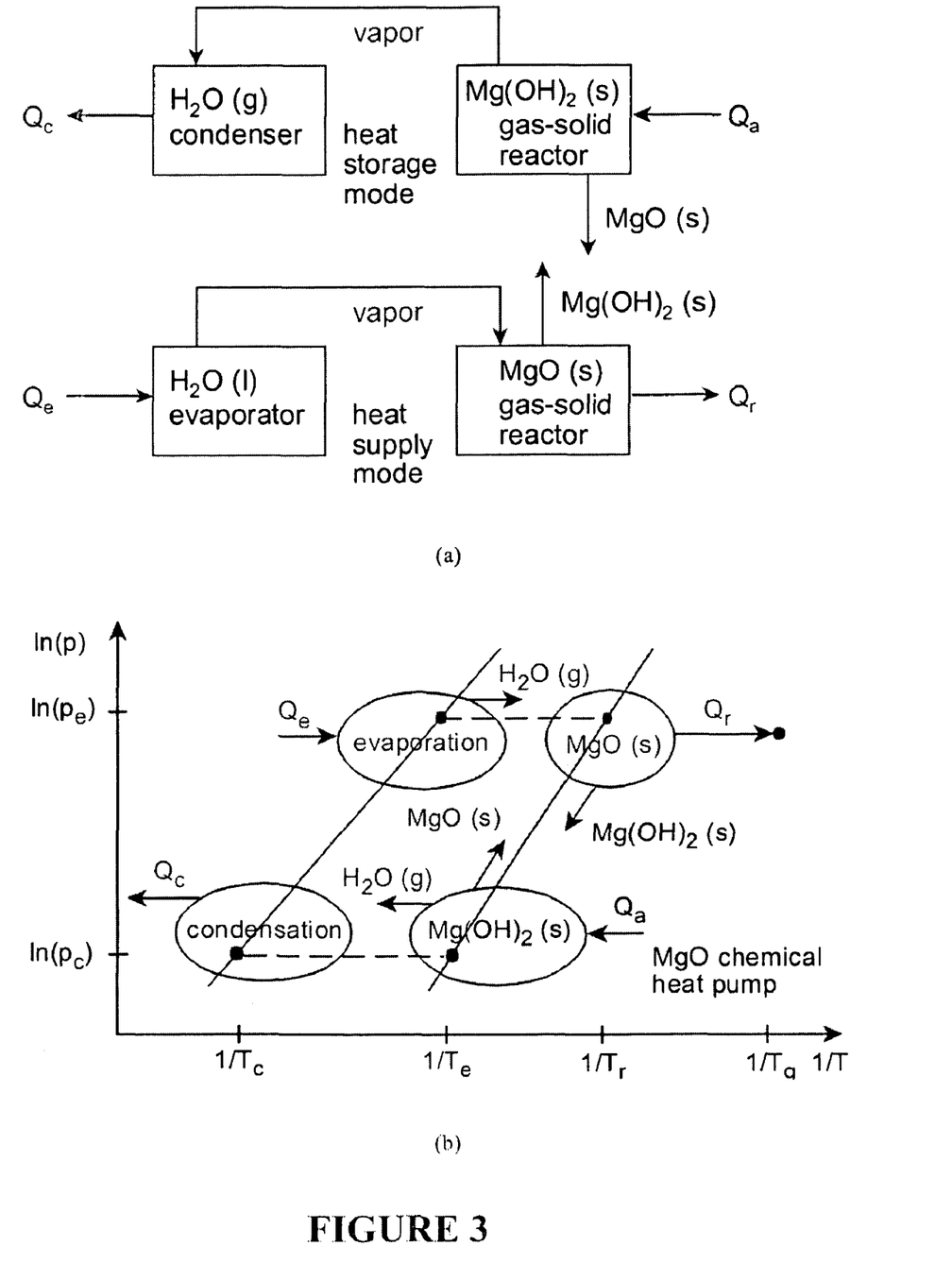

The rightward reaction is exothermic hydration. The kinetics of the reaction has been reported by Kato et al. (Kato, Y, Yamashita, N, Kobayashi, K, Yoshizawa, Y. *Kinetic study of the hydration of magnesium oxide for a chemical heat pump, Applied Thermal Engineering*, sol. 16, no. 11, pp. 853-862, 1996). FIG. 3 illustrates a schematic of the operating principles of this chemical heat pump. The operation consists of heat storage and heat supply modes, with solid products from each reactor supplied as solid feed to the other. Magnesium hydroxide (Mg $(OH)_2$) is initially charged into a gas/solid reactor. Heat is added, after which solid and water vapour are formed. The heat of condensation is recovered from the steam and the resulting water is stored as a liquid. In the heat supply mode, the stored water is then vapourized by another separate heat input. The vapour is supplied to an exothermic solid/gas reactor for hydration.

Figure 4:
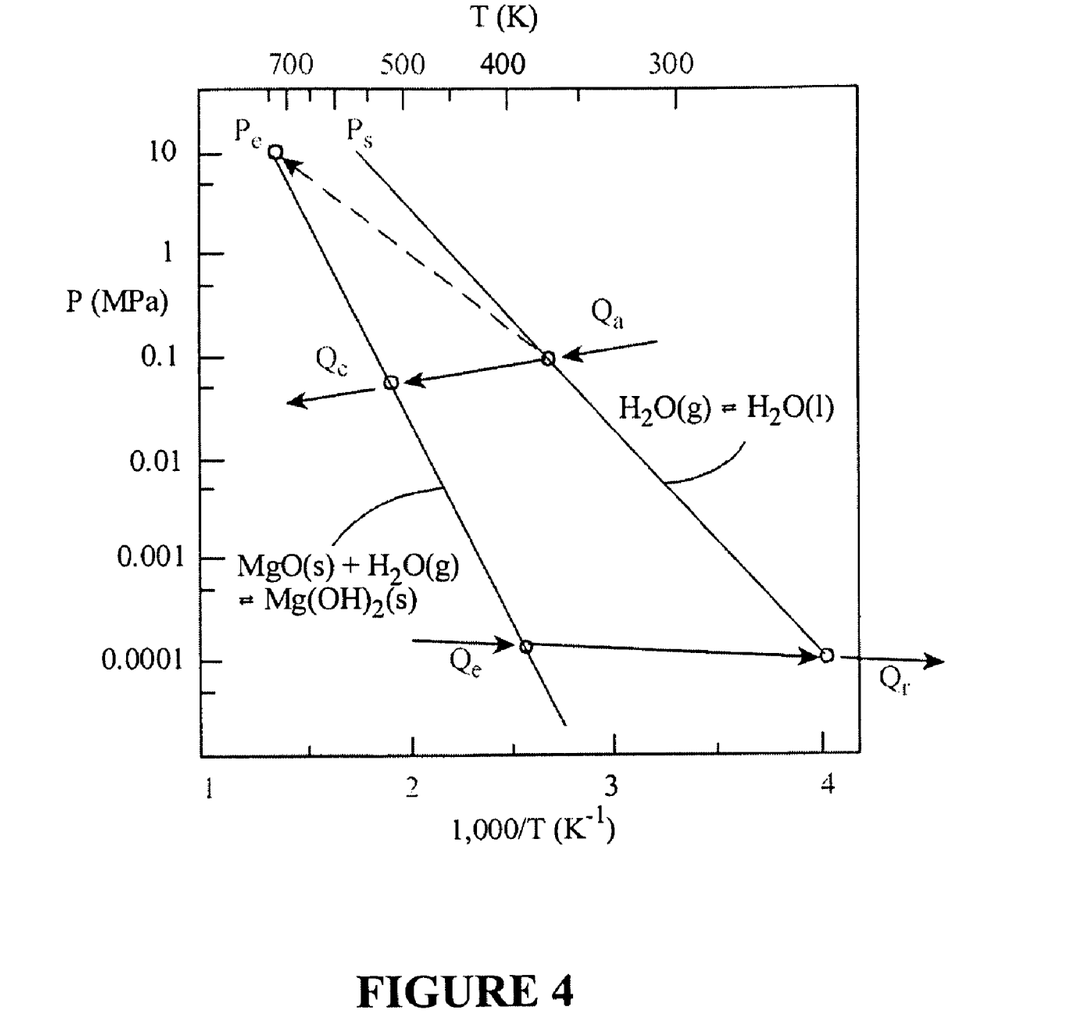
FIG. 4 is an equilibrium diagram for an MgO/vapour chemical heat pump.

The maximum theoretical coefficient of performance (COP) for this chemical heat pump is the Carnot COP. Consider the equilibrium diagram of the chemical heat pump in FIG. 4. The system transforms heat through both heat storage and supply modes, so cooling and heating COP values will be calculated. Performing an energy balance for the chemical heat pump, $$W + Q_e + Q_a - Q_c - Q_r = 0 \quad (4)$$

where individual variables are illustrated in FIG. 4. From the second law of thermodynamics, the entropy balance is $$\frac{Q_e}{T_e} + \frac{Q_a}{T_e} - \frac{Q_c}{T_c} - \frac{Q_r}{T_g} + S_{gen} = 0 \quad (5)$$

If all processes within the chemical heat pump are reversible, then the entropy generation becomes zero and Eqs. (4)-(5) can be combined as follows, $$Q_c\left(\frac{1}{T_c} - \frac{1}{T_e}\right) - Q_r\left(\frac{1}{T_e} - \frac{1}{T_g}\right) + \frac{W}{T_e} = 0 \quad (6)$$

Assuming the pressure change of vapour flow throughout the heat storage mode is negligible, the work input to the chemical heat pump is neglected in Eq. (4) and the Carnot COP for cooling becomes $$COP_c^c = \frac{Q_c}{Q_r} = \frac{1/T_e - 1/T_g}{1/T_c - 1/T_e} \quad (7)$$

The temperature at which heat absorption occurs in the chemical heat pump can be modified by pressurizing the vapour supply flow to the endothermic reactor, at the equilibrium pressure of the desired operating temperature. In this case, the work input term, W, in Eq. (4) cannot be neglected, so the cooling COP becomes $$COP_c^{c,w} = \frac{(1/T_e)(1 - W/Q_r) - 1/T_g}{1/T_c - 1/T_e} \quad (8)$$

This result is similar to Eq. (7), except the first term in the numerator subtracts a quantity that represents the relative portion of thermal performance lost, due to energy input needed to drive compressors to pressurize the gas stream.

The Carnot COP for heating (without work input from compressors) is given by $$COP_c^h = \frac{Q_c + Q_r}{Q_r} = \frac{1/T_c - 1/T_g}{1/T_c - 1/T_e} \quad (9)$$

In a similar fashion when work input is included due to a pressure change across the heat supply mode, in order to modify the temperature at which heat is released by the chemical heat pump, the work term is included in Eq. (4) and the heating COP becomes $$COP_c^{h,w} = \frac{1/T_c - 1/T_g - (1/T_e)(W/Q_r)}{1/T_c - 1/T_e} \quad (10)$$

The benefit of heat release at higher temperatures in the heating COP comes at the expense of additional compressor work input to the cycle, in order to raise the gas pressure.

Figure 5:
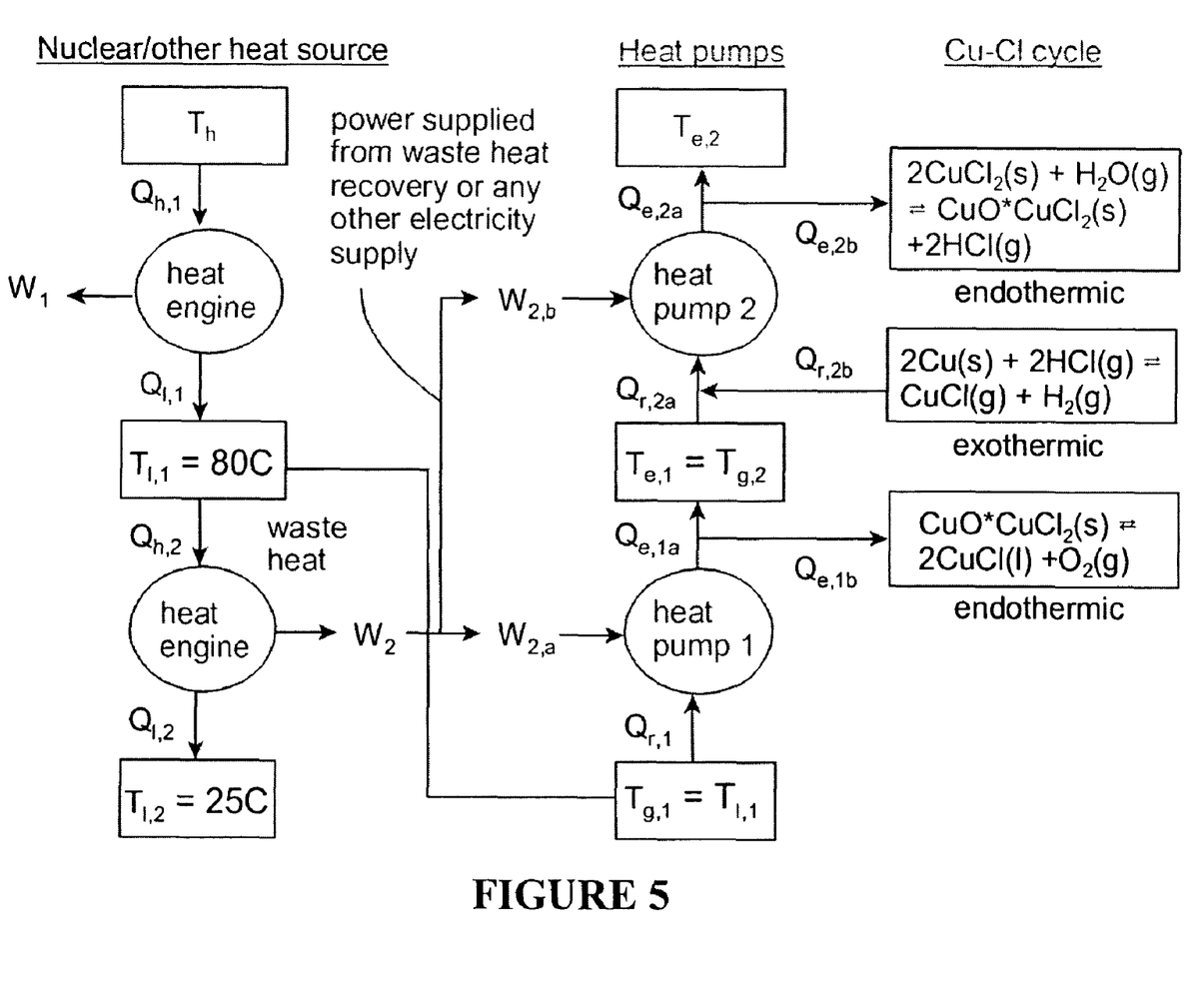
FIG. 5 is a schematic diagram of combined heat recovery, chemical heat pumps and Cu—Cl cycle.

A schematic diagram for coupled CHPs and a Cu—Cl thermochemical cycle is illustrated in FIG. 5. The figure shows how an exothermic step within the Cu—Cl cycle supplies heat into the MgO/vapour CHP, to be subsequently upgraded to a higher temperature that is then used by the endothermic hydrolysis step in the Cu—Cl cycle. The lower temperature endothermic step of copper oxychloride decomposition could be supplied separately from the salt/ammonia CHP.

FIG. 5 also shows that input power is needed to drive compressors in the CHPs. With existing heat recovery technology, electricity generated from waste heat could be supplied directly to the CHPs, thereby potentially making the CHPs and Cu—Cl cycle solely driven by waste heat at 80° C. (for example, the temperature of the moderator coolant in CANDU nuclear reactors).

Figure 6:
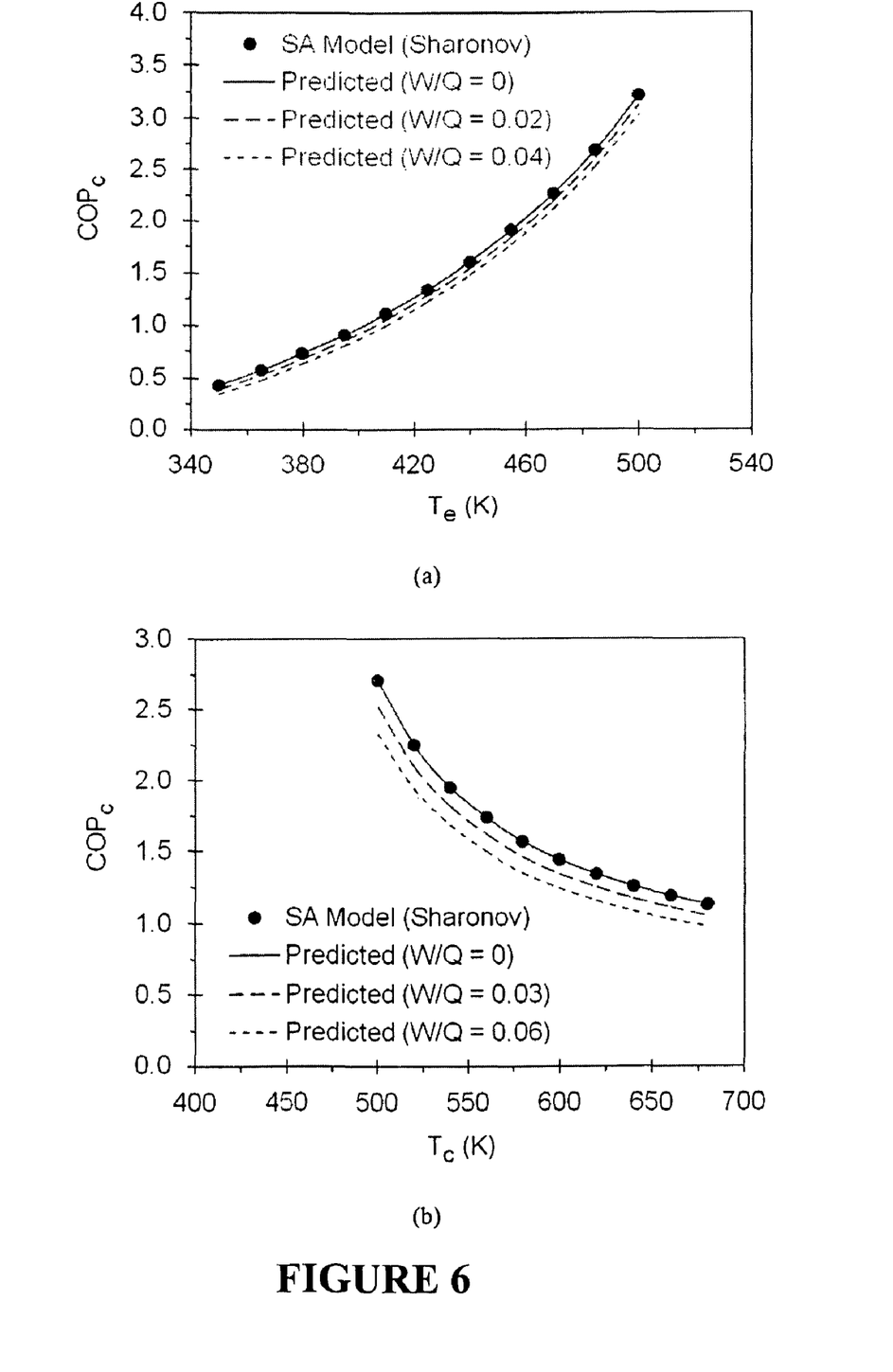

The coefficient of performance, COP, of the MgO/vapour chemical heat pump at varying temperatures is shown in FIG. 6. In FIG. 6*a*, the COP rises at higher evaporation temperatures. The predicted model exhibits close agreement with past data (Sharonov, V E, Aristov, Y I. *Chemical and adsorption heat pumps: Comments on the second law efficiency, Chemical Engineering Journal*, vol. 136, pp. 419-424, 2008), when the saturation pressure equals the equilibrium reaction pressure, upon assuming zero compressor power to pressurize the reactant. In practice, some input power is needed to pressurize the vapour by a compressor(s). In FIG. 6*a*, the COP decreases when more input power is used, relative to heat output (characterized by the W/Q ratio), due to less heat exchange from an overall system energy balance. In FIG. 6*b*, the predicted COP for cooling also agrees well with the model of Sharonov and Aristov (2008). The COP decreases at higher condensation temperatures, since the heat output is released at a higher temperature, which corresponds to a lower operating pressure that requires a vacuum below atmospheric pressure. The results illustrate the Carnot COP, which exceeds the actual COP, due to internal irreversibilities within an actual system.

Vapour Compression Heat Pump

Unlike chemical heat pumps, a more developed and mature technology for upgrading heat from low to higher temperatures is the conventional vapor compression heat pump. Refrigerators, air conditioners and ground source heat pumps operate in this manner. The cycle consists of four main parts: i) condenser, ii) expansion valve, iii) evaporator and (iv) compressor. The refrigerant in gaseous form is pressurized and circulated from the evaporator outlet by a compressor to the condenser. The hot and highly pressurized gas is cooled in a heat exchanger, until it condenses at a high pressure. The condensed fluid is then passed through an expansion valve, which reduces pressure at nearly constant enthalpy, followed by a heat exchanger (called the evaporator) where the fluid evaporates into a gas by heat absorption. The fluid exiting the evaporator as saturated vapor returns to the compressor and the cycle is repeated.

The fluid must reach a sufficiently low temperature when expanded through the valve, otherwise heat cannot flow from the cold region into the fluid. Also, the pressure difference across the cycle must be large enough for the fluid to condense at a high temperature. When the temperature difference increases, the required pressure difference becomes larger and more energy is needed to compress the fluid. As a result, the energy efficiency decreases with higher temperature differences. The efficiency of a single heat pump between temperatures of low grade waste heat and the endothermic step 1 of the Cu—Cl cycle would be low or unworkable for a single-stage compression, so upgrading of waste heat would require multiple stages of compression.

Low temperature heat pumps are commercially available for residential and cooling applications, but high-temperature heat pumps up to 500° C. are uncommon and relatively undeveloped technology, compared to low temperature systems. For the purpose of thermochemical hydrogen production in the Cu—Cl cycle, the working fluid must have 1) a melting point ($T_m$) lower than 70° C., 2) boiling point ($T_{sat}$) below 75° C. and 3) a critical point ($T_c$) above 510° C. A summary of four viable fluids for upgrading waste heat for this thermochemical hydrogen production is listed in Table 3. In each case, the boiling point can be reduced below the saturation temperature at atmospheric pressure in Table 3, in order for the "waste heat" at low temperature to be transferred to the working fluid. For example, a $C_9H_7N$ heat pump with low-pressure evaporation and a saturation temperature of about 70° C. can transform heat up to 520° C., although multiple stages are needed for compressor operation. Another option is adopting a chemical heat pump to raise the fluid temperature from the waste heat source at about 70° C. to 240° C., followed by a $C_9H_7N$ heat pump with vapor compression from 240° C. to 520° C.

TABLE 3

Working fluids for the vapor-compression heat pump

| Working fluid | $T_m$ (° C.), melting point | $T_{sat}$ (° C.), boiling point | $T_c$ (° C.), critical point |
|---|---|---|---|
| $C_{13}H_{12}$ (Diphenylmethane) | 24 | 264 | 497 |
| $C_{12}H_{10}$ (Diphenyl) | 69 | 256 | 506 |
| $C_9H_7N$ (Isoquinoline) | 28 | 242 | 530 |
| $Br_4Ti$ (Titanium tetrabromide) | 40 | 230 | 523 |

System Equipment and Operation

Three general levels of temperature characterize the reaction steps of the Cu—Cl cycle: i) about 70-80° C. (waste heat, steps 2 and 3), ii) low to mid 400° C. range (steps 1 and 4) and iii) low 500° C. range (step 5). Step 1 is exothermic, while other processes are endothermic. The heat pumps can upgrade temperatures between any or all of the three levels. Thus, the heat pumps operate in two ranges: range 1 between levels 1-2, and range 2 between levels 2-3. The first range is further subdivided into two intervals, 1a (up to about 250° C.) and 1b, since multi-stage compressors are needed for efficient performance. Stage 1a uses the salt/ammonia CHP, while stages 1b and 2 use the MgO/vapour CHP. Operation of a single CHP over different ranges requires two different operating pressures. The vapour compression heat pumps also work over any or all of the stages, although they too would operate in intervals 1a, 1b and 2. Given there are two endothermic steps at the level 1 temperature (steps 2 and 3), one step at level 2 (step 4) and one remaining step at level 3 (step 5), this implies the system may use any number between 1 and 4 heat pumps. These combinations include waste heat at level 1 up to level 2 (intervals 1a, 1b), and subsequently to level 3 from waste heat, or level 2.

The MgO/vapour CHP consists of an evaporator, packed bed reactor, reactor plate, heating tubes, radiation heater, cooler, fluid circulator, controller and valves. The packed bed reactor is made of stainless steel and the particle reactant $Mg(OH)_2$ is initially loaded into the reactor. A typical setup uses oxide powder consisting of 15 mm diameter particles that are hydrated with purified water in a ball mill. Further details and detailed drawings of an MgO/vapour CHP have been documented by Kato et al. (Kato Y, Takahashi F, Watanabe A, Yoshizawa Y, *Thermal analysis of a magnesium oxide/water chemical heat pump for cogeneration, Applied Thermal Engineering*, vol. 21, pp. 1067-1081, 2001).

For the salt/ammonia CHP, the equipment components are shell-and-tube heat exchangers made of stainless steel, gas-solid fluidized bed reactors made of carbon steel, compressor, piping and valves. In this case, equipment details are described by Spoelstra et al. (Spoelstra, S, Haije, W G, Dijkstra, J W *Techno-economic feasibility of high-temperature high-lift chemical heat pumps for upgrading industrial waste heat, Applied Thermal Engineering*, vol. 22, pp. 1619-1630, 2002) for an operating capacity of about 2 MW heat supply at 240° C. from a heat source at 140° C. Equipment sizes would be scaled proportionally based on the required hydrogen output from the Cu—Cl cycle.

For the vapour compression heat pump, standard components of ground source heat pumps are used, i.e., evaporator, compressor, condenser, valves, piping and electrical controls. However, different materials are needed due to non-conventional working fluids. As discussed previously, diphenylmethane, diphenyl, isoquinoline or titanium tetrabromide are possible working fluids, among others. Diphenylmethane is an organic compound that consists of methane with two hydrogen atoms replaced by two phenyl groups. Diphenyl is used for the production of polychlorinated biphenyls (PCBs) in dielectric fluids and heat transfer agents. Biphenyl is also used for the production of various organic compounds such as emulsifiers, optical brighteners, crop protection products, and plastics. Isoquinolines are used in the manufacture of dyes, paints, insecticides and antifungals, as well as a corrosion inhibitor and solvent for the extraction of resins and terpenes. Titanium tetrachloride (similar to titanium tetrabromide) is a dense, colourless distillable liquid, which is used in the production of titanium metal, pigments (titanium oxide) and smokescreens. Another possible working fluid is a siloxane (organic compound $R_2SiO$, where R is a hydrogen atom or hydrocarbon group), which has low/non-toxicity, excellent thermal stability, limited flammability, and good thermodynamic properties. Also, siloxanes are currently bulk-produced for applications like cosmetics and vegetable oils. As a result, all of the possible working fluids for the high-temperature vapour compression heat pumps have existing industrial applications, wherein the liquids are handled by fluids engineering equipment whose materials can be adopted for a heat pump.

Proof-of-principle experiments for all of the listed processes herein have been conducted to demonstrate their scientific feasibility, including the Cu—Cl cycle (Lewis M A, Serban M, Basco J K. *Hydrogen Production at <550° C. Using a Low Temperature Thermochemical Cycle, ANS/ENS Exposition*, New Orleans, November, 2003), MgO/vapour CHP (Kato Y, Takahashi F, Watanabe A, Yoshizawa Y, *Thermal analysis of a magnesium oxide/water chemical heat pump for cogeneration, Applied Thermal Engineering*, vol. 21, pp. 1067-1081, 2001) and salt/ammonia CHP (Spoelstra, S, Haije, W G, Dijkstra, J W. *Techno-economic feasibility of high-temperature high-lift chemical heat pumps for upgrading industrial waste heat, Applied Thermal Engineering*, vol. 22, pp. 1619-1630, 2002).

Though the invention has been described with reference to certain examples, optionally incorporating various features, the invention is not to be limited to the schematics described. The invention is not limited to the uses noted or by way of the exemplary description provided herein. It is to be understood that the breadth of the present invention is to be limited only by the literal or equitable scope of the following claims.

The invention claimed is:

1. A process for obtaining hydrogen gas and oxygen gas from water decomposition comprising using a copper-chlorine (Cu—Cl) thermochemical cycle comprising the steps of:
   1) reacting electrolytic Cu and dry HCl to obtain hydrogen gas and molten CuCl salt;
   2) subjecting solid CuCl and HCl in an aqueous solution to electrolysis to obtain Cu and an aqueous slurry containing HCl and $CuCl_2$;
   3) drying the aqueous slurry obtained from step (2) to obtain solid $CuCl_2$ and $H_2O$/HCl vapour;
   4) reacting the solid $CuCl_2$ with steam to obtain solid $CuOCuCl_2$ and gaseous HCl;

5) decomposing the solid $CuOCuCl_2$ obtained in step 4 at a temperature of about 500° C. to obtain molten CuCl and oxygen gas; and wherein at least one first chemical heat pump that upgrades low grade heat from an industrial source to a higher intermediate temperature, supplies heat to the endothermic step 4) of the hydrogen gas production cycle and at least one second chemical heat pump that is a solid-gas heat pump and utilises a high temperature salt to upgrade heat from the exothermic step 1) of the hydrogen gas production cycle, to a higher temperature needed by the endothermic oxygen step 5) of the hydrogen gas production cycle.

2. A process as claimed in claim 1, wherein a plurality of chemical heat pumps that upgrade low grade heat from an industrial source are used to supply heat to the endothermic reactions of the Cu—Cl cycle.

3. A process as claimed in claim 1, wherein the first chemical heat pump comprises a salt/ammonia heat pump and the second chemical heat pump comprises an MgO/water vapour system.

4. A process as claimed in claim 1, wherein the low grade heat is waste heat from an industrial source.

5. A process as claimed in claim 4, wherein the industrial source is a nuclear power plant.

6. A process as claimed in claim 1, wherein the at least one first chemical heat pump is a vapour compression heat pump with a critical point of the working fluid below the maximum temperature of the thermochemical cycle.

7. A process as claimed in claim 1, wherein any combination of vapour compression and chemical heat pumps are used for the Cu—Cl cycle.

8. A process as claimed in claim 6 wherein the working fluid is selected from the group comprising $C_{13}H_{12}$ (diphenylmethane), $C_{12}H_{10}$ (diphenyl), $C_9H_7N$ (isoquinoline) and $Br_4Ti$ (titanium tetrabromide).

\* \* \* \* \*